United States Patent
Suciu et al.

(10) Patent No.: US 10,358,981 B2
(45) Date of Patent: Jul. 23, 2019

(54) HIGH AND LOW SPOOL ACCESSORY GEARBOX DRIVE

(71) Applicant: United Technologies Corporation, Farmington, CT (US)

(72) Inventors: Gabriel L. Suciu, Glastonbury, CT (US); Hung Duong, Unionville, CT (US); Jonathan F. Zimmitti, Glastonbury, CT (US); William G. Sheridan, Southington, CT (US); Michael E. McCune, Colchester, CT (US); Brian Merry, Andover, CT (US)

(73) Assignee: United Technologies Corporation, Farmington, CT (US)

( * ) Notice: Subject to any disclaimer, the term of this patent is extended or adjusted under 35 U.S.C. 154(b) by 108 days.

(21) Appl. No.: 15/484,376

(22) Filed: Apr. 11, 2017

(65) Prior Publication Data

US 2018/0291817 A1   Oct. 11, 2018

(51) Int. Cl.
| | | |
|---|---|---|
| *F02C 7/32* | (2006.01) | |
| *F02C 7/18* | (2006.01) | |
| *F02C 7/36* | (2006.01) | |

(52) U.S. Cl.
CPC .............. *F02C 7/32* (2013.01); *F02C 7/185* (2013.01); *F02C 7/36* (2013.01); *F05D 2220/764* (2013.01); *F05D 2220/768* (2013.01); *F05D 2270/023* (2013.01)

(58) Field of Classification Search
CPC .... F02C 7/32; F02C 7/36; F02C 7/185; F05D 2270/023; F05D 2220/764; F05D 2220/768
See application file for complete search history.

(56) References Cited

U.S. PATENT DOCUMENTS

| | | | |
|---|---|---|---|
| 6,050,079 A * | 4/2000 | Durgin | F01D 5/082 |
| | | | 415/115 |
| 7,882,691 B2 | 2/2011 | Lemmers, Jr. et al. | |
| 8,966,875 B2 | 3/2015 | Suciu et al. | |
| 9,200,569 B2 | 12/2015 | Suciu et al. | |
| 9,200,592 B2 | 12/2015 | Berryann et al. | |
| 9,388,737 B2 | 7/2016 | Kraft | |

(Continued)

FOREIGN PATENT DOCUMENTS

| | | |
|---|---|---|
| EP | 2728141 A2 | 5/2014 |
| EP | 3032074 A1 | 6/2016 |
| EP | 3351769 A1 | 7/2018 |

OTHER PUBLICATIONS

European Search Report for EP Application No. 18166346.9 dated Aug. 24, 2018.

*Primary Examiner* — James A English
(74) *Attorney, Agent, or Firm* — Carlson, Gaskey & Olds, P.C.

(57) ABSTRACT

A gas turbine engine comprises a low speed spool and a high speed spool, with each of the spools including a turbine to drive a respective one of the spools. The high speed spool rotates at a higher speed than the low speed spool. A high speed power takeoff is driven to rotate by the high speed spool, and a low speed power takeoff is driven to rotate by the low speed spool. The high speed power takeoff drives a starter generator and a permanent magnet alternator. The low speed power takeoff drives a variable frequency generator.

15 Claims, 2 Drawing Sheets

(56) References Cited

U.S. PATENT DOCUMENTS

| | | | |
|---|---|---|---|
| 2005/0183540 A1* | 8/2005 | Miller | F02C 7/32 74/665 GA |
| 2009/0188334 A1 | 7/2009 | Merry et al. | |
| 2010/0133832 A1* | 6/2010 | Butt | B64C 11/48 290/46 |
| 2011/0101693 A1* | 5/2011 | Goi | F02C 7/275 290/46 |
| 2013/0025406 A1* | 1/2013 | Lemmers, Jr. | F02C 7/36 74/650 |
| 2013/0098060 A1 | 4/2013 | Suciu et al. | |
| 2013/0183136 A1 | 7/2013 | Roberge et al. | |
| 2015/0330300 A1* | 11/2015 | Suciu | F02C 7/27 416/169 R |
| 2016/0312711 A1 | 10/2016 | Suciu et al. | |
| 2017/0210478 A1* | 7/2017 | Mackin | B64D 15/12 |
| 2018/0202368 A1* | 7/2018 | Suciu | F02C 7/275 |
| 2018/0266329 A1* | 9/2018 | Mackin | F02C 7/36 |
| 2018/0291818 A1* | 10/2018 | Suciu | F02C 7/32 |

* cited by examiner

HIGH AND LOW SPOOL ACCESSORY GEARBOX DRIVE

BACKGROUND OF THE INVENTION

This application relates to an accessory gearbox drive for a gas turbine engine wherein a low spool drives a variable frequency generator along with other components.

Gas turbine engines are known and typically include a pair of spools.

A fan delivers air into a bypass duct as propulsion air and also delivers air into a core engine. Air passing into the core engine reaches a low pressure compressor and then passes to a high pressure compressor. The air compressed by the high pressure compressor is delivered into a combustor where it is mixed with fuel and ignited. Products of this combustion pass downstream over a high pressure turbine rotor.

The high pressure turbine rotor is driven to rotate and rotates the high pressure compressor. A low pressure turbine rotor is downstream of the high pressure turbine and is also driven to rotate. The low pressure turbine rotates with the low pressure compressor as a low speed spool. Further, the low pressure turbine may drive the fan rotor through a gear reduction.

A number of accessories, such as generators, starters, pumps, etc., are powered by accessory gearboxes which are driven to rotate with either the high or low pressure spool. Traditionally, the high pressure spool has driven most of these accessories.

However, this reduces the overall efficiency of the engine. Thus, it has been proposed to drive at least some accessories off the low speed spool.

SUMMARY OF THE INVENTION

In a featured embodiment, a gas turbine engine comprises a low speed spool and a high speed spool, with each of the spools including a turbine to drive a respective one of the spools. The high speed spool rotates at a higher speed than the low speed spool. A high speed power takeoff is driven to rotate by the high speed spool, and a low speed power takeoff is driven to rotate by the low speed spool. The high speed power takeoff drives a starter generator and a permanent magnet alternator. The low speed power takeoff drives a variable frequency generator.

In another embodiment according to the previous embodiment, a first transmission is driven by the low speed or power takeoff, and the first transmission drives the variable frequency generator at a plurality of speeds.

In another embodiment according to any of the previous embodiments, the first transmission also drives a hydraulic pump at one of a plurality of distinct speeds relative to an input speed from the low speed power takeoff.

In another embodiment according to any of the previous embodiments, a controller controls the first transmission to achieve a desired input speed for the variable frequency generator.

In another embodiment according to any of the previous embodiments, the controller also controls the first transmission to drive a hydraulic pump at a desired speed.

In another embodiment according to any of the previous embodiments, the low speed power takeoff also drives an oil pump.

In another embodiment according to any of the previous embodiments, cooling air is tapped from a location in a compressor section which is upstream of a most downstream location in the compressor section and the tapped air is passed through a heat exchanger and through a cooling air compressor.

In another embodiment according to any of the previous embodiments, the low speed spool power takeoff drives the cooling air compressor.

In another embodiment according to any of the previous embodiments, a second transmission is driven by the low power takeoff to drive the cooling air compressor at a desired speed.

In another embodiment according to any of the previous embodiments, the second transmission is a three-speed transmission.

In another embodiment according to any of the previous embodiments, the controller controls the second transmission to achieve a desired speed for the cooling air compressor.

In another embodiment according to any of the previous embodiments, cooling air is tapped from a location in a compressor section which is upstream of a most downstream location in the compressor section and the tapped air is passed through a heat exchanger and through a cooling air compressor.

In another embodiment according to any of the previous embodiments, the low speed spool power takeoff drives the cooling air compressor.

In another embodiment according to any of the previous embodiments, a second transmission is driven by the low power takeoff to drive the cooling air compressor at a desired speed.

In another embodiment according to any of the previous embodiments, the second transmission is a three-speed transmission.

In another embodiment according to any of the previous embodiments, the controller controls the second transmission to achieve a desired speed for the cooling air compressor.

In another embodiment according to any of the previous embodiments, the controller controls the first transmission to achieve a desired input speed tor the variable frequency generator.

In another embodiment according to any of the previous embodiments, the controller also controls the first transmission to drive a hydraulic pump at a desired speed.

In another embodiment according to any of the previous embodiments, cooling air is tapped from a location in a compressor section which is upstream of a most downstream location in the compressor section and the tapped air is passed through a heat exchanger and through a cooling air compressor.

In another embodiment according to any of the previous embodiments, a second transmission is driven by the low power takeoff to drive the cooling air compressor at a desired speed.

These and other features may be best understood from the following drawings and specification.

DETAILED DESCRIPTION

Figure 1A:
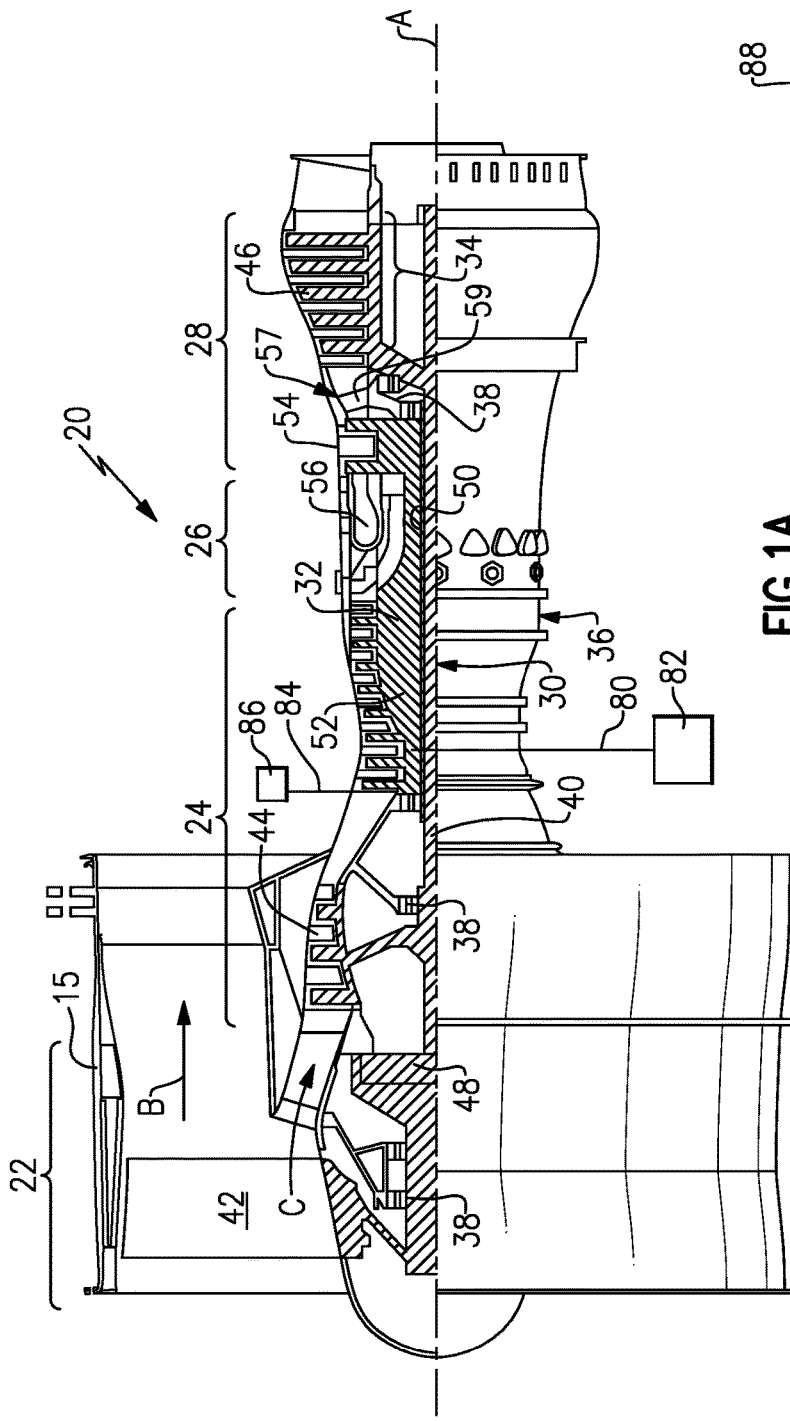
FIG. 1A schematically shows a gas turbine engine.

FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°R)/(518.7°R)]^{0.5}$. The "Low corrected fan tip speed" as disclosed herein according to one non-limiting embodiment is less than about 1150 ft/second (350.5 meters/second).

FIG. 1A also shows a power takeoff or power shaft 80 being driven to rotate with the high speed spool 32 and driving accessory gears 82. At the same time, a second power takeoff or power shaft 84 rotates with the low speed spool 30 and drives additional accessories shown schematically at 86.

Figure 1B:
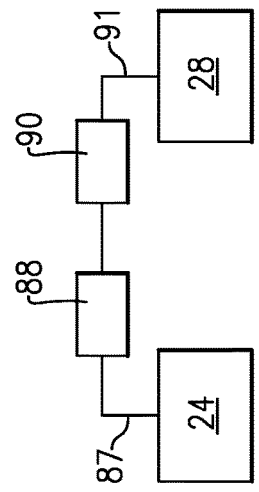
FIG. 1B shows an optional feature for delivering cooling air to a turbine section.

FIG. 1B shows an optional feature. A tap 87 taps cooling air from a location in the compressor section 24 which is upstream of a downstream most point in the compressor section. Tapping the air from this more upstream location increases the efficiency of the engine compared to tapping the highly compressed air downstream of the last stage of the high pressure compressor 52. However, this tapped air is not at a sufficiently high pressure to necessarily enter the turbine section 28 for cooling. Thus, a cooling air compressor 88 is provided to increase the pressure of the air from tap 87. Downstream of the compressor 88, the air passes through a heat exchanger 90 where it is cooled by air such as the bypass air B. Downstream of the heat exchanger 90, the air passes into a line 91 and moves to cool components in the turbine section 28. Such systems have been generally proposed.

Figure 2A:
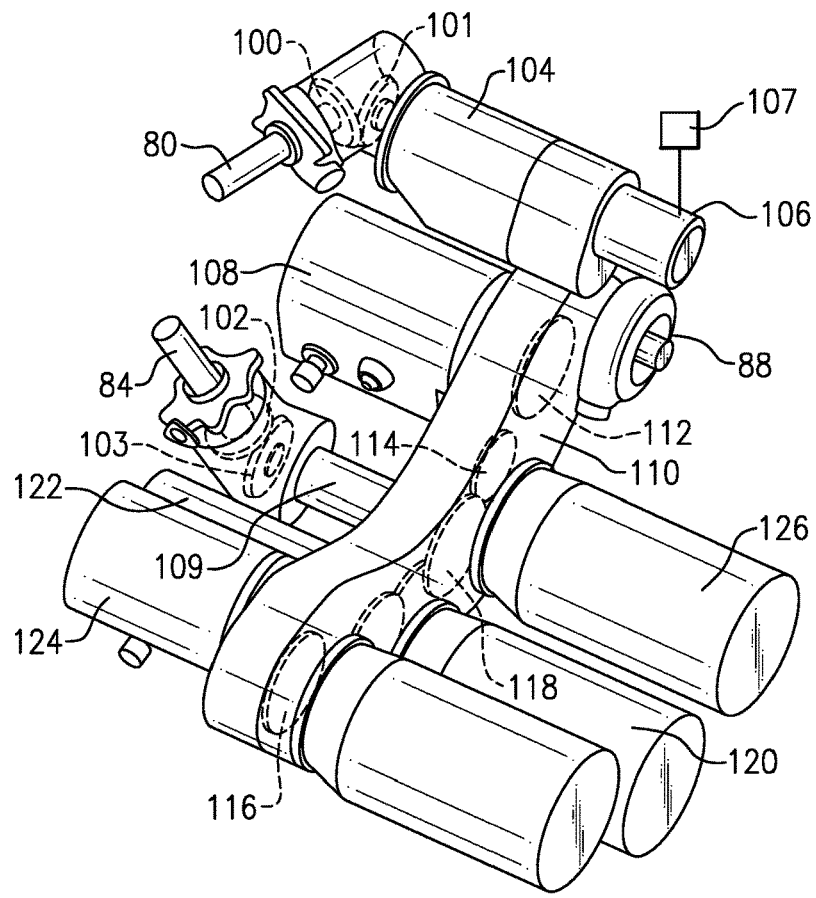
FIG. 2A shows an accessory drive arrangement.

FIG. 2A shows an arrangement for driving a number of accessories. As shown in FIG. 2A, the shaft 80 drives a bevel gear 100 which drives a second bevel gear 101 which rotates to drive accessories, as will be explained below.

The shaft 84 drives a gear 102 to drive a gear 103 which is associated with the shaft for driving accessories driven by the low speed shaft 84.

As shown, the shaft driven by gear 101 includes a starter generator 104 and a permanent magnet alternator 106. These components are necessary for initially starting the gas turbine engine. The permanent magnet alternator is necessary to start or "fire up" a controller 107 for the engine, which is shown schematically. The starter generator 104 begins rotation of the engine at start-up, as is known.

By minimizing the number of components driven by the high speed driven shaft 80, the efficiency of the overall engine is increased.

The gear 103 drives a shaft 109 drive a gearbox 110, which drives a number of components through a plurality of gears 112, 114, 116, 118. The gears allow the various accessories to be driven by the shaft 84 to rotate at different speeds.

As shown, the cooling air compressor 88 may be driven by the shaft 84. In the disclosed embodiment, the gear 112 drives a transmission 108, which actually drives the compressor 88 at a desired speed. The use of the transmission 108 allows the speed of the compressor 88 to be kept closer to a constant value than it might otherwise see from the input at shaft 84. That is, it is known that the input from the high speed spool 80 will be closer to constant than would be the input speed to the shaft 84. The use of the transmission, which may be a three-speed transmission 108, allows the ultimate speed of the compressor 88 to be kept closer to a desired constant value.

In addition, a variable frequency generator 120 is driven by a transmission 122, which may also be a three-speed transmission. Here again, the transmission 122 keeps the speed of the variable frequency generator 120 closer to constant such that the output of the generator will be more readily useable.

In addition, a hydraulic pump 124 is provided for supplying hydraulic fluid across the engine. Hydraulic pump 124 may also be driven by the three-speed transmission 122.

In addition, an oil pump 126 is driven by the input shaft 109 and may be driven through the several gears in the gearbox 110 to achieve a desired speed.

Figure 2B:
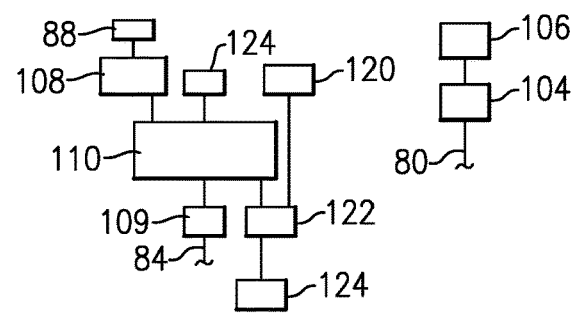
FIG. 2B schematically shows the arrangement of FIG. 2A.

FIG. 2B schematically shows the drive inputs into the several components. As shown, the shaft 80 drives the starter generator 104 and permanent magnet alternator 106 on a common shaft.

The drive shaft 109 is driven by shaft 84, and drives a plurality of gears in a gearbox 110 to drive a three-speed transmission 122 to drive a variable frequency generator 120.

Similarly, the gearbox 110 drives a three-speed transmission 108 to ultimately drive the cooling air compressor 88.

The controller 107 may also control the three-speed transmissions 108 and 122 to achieve desired speeds for the cooling compressor 88, variable frequency generator 120 and pump 124. A worker of ordinary skill in the art would recognize how to control the transmissions 108 and 122 to achieve this goal. Also, as mentioned, the transmission 122 controls the speed of the hydraulic pump 124. Further, the shaft 109 also drives the pump 126.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
    a low speed spool and a high speed spool, with each of said spools including a turbine to drive a respective one of said spools;
    said high speed spool rotating at a higher speed than said low speed spool;
    a high speed power takeoff driven to rotate by said high speed spool, and a low speed power takeoff driven to rotate by said low speed spool;
    said high speed power takeoff driving a starter generator and a permanent magnet alternator;
    said low speed power takeoff driving a variable frequency generator; and
    wherein cooling air is tapped from a location in a compressor section which is upstream of a most downstream location in said compressor section and said tapped air being passed through a heat exchanger and through a cooling air compressor.

2. The gas turbine engine as set forth in claim 1, wherein a first transmission is driven by said low speed power takeoff, and said first transmission driving said variable frequency generator at a plurality of speeds.

3. The gas turbine engine as set forth in claim 2, wherein said first transmission also driving a hydraulic pump at one of a plurality of distinct speeds relative to an input speed from said low speed power takeoff.

4. The gas turbine engine as set forth in claim 3, wherein a controller controls said first transmission to achieve a desired input speed for said variable frequency generator.

5. The gas turbine engine as set forth in claim 4, wherein said controller also controls said first transmission to drive said hydraulic pump at a desired speed.

6. The gas turbine engine as set forth in claim 5, wherein said low speed power takeoff also driving an oil pump.

7. The gas turbine engine as set forth in claim 6, wherein a second transmission is driven by said low power takeoff to drive said cooling air compressor at a desired speed.

8. The gas turbine engine as set forth in claim 7, wherein said second transmission is a three-speed transmission.

9. The gas turbine engine as set forth in claim 8, wherein said controller controlling said second transmission to achieve a desired speed for said cooling air compressor.

10. The gas turbine engine as set forth in claim 2, wherein a second transmission is driven by said low power takeoff to drive said cooling air compressor at a desired speed.

11. The gas turbine engine as set forth in claim 10, wherein said second transmission is a three-speed transmission.

12. The gas turbine engine as set forth in claim 11, wherein said controller controlling said second transmission to achieve a desired speed for said cooling air compressor.

13. The gas turbine engine as set forth in claim 2, wherein a controller controls said first transmission to achieve a desired input speed tor said variable frequency generator.

14. The gas turbine engine as set forth in claim 13, wherein said controller also controls said first transmission to drive a hydraulic pump at a desired speed.

15. The gas turbine engine as set forth in claim 13, wherein a second transmission is driven by said low power takeoff to drive said cooling air compressor at a desired speed.

* * * * *